United States Patent [19]
Goldberg et al.

[11] Patent Number: 5,319,782
[45] Date of Patent: Jun. 7, 1994

[54] METHOD FOR SYNCHRONIZING THE DISPATCHING OF TASKS AMONG MULTITASKING OPERATING SYSTEMS

[75] Inventors: Steven H. Goldberg, Hillsborough; Gerald W. Holten, San Jose; Jerome A. Mouton, Jr., Palo Alto, all of Calif.

[73] Assignee: International Business Machines, Armonk, N.Y.

[21] Appl. No.: 18,341

[22] Filed: Feb. 16, 1993

Related U.S. Application Data

[63] Continuation of Ser. No. 304,740, Jan. 31, 1989, abandoned.

[51] Int. Cl.$^5$ .............................. G06F 12/00
[52] U.S. Cl. ........................ 395/650; 364/DIG. 1; 364/281.6; 364/281.8
[58] Field of Search ........................ 395/650, 700

[56] References Cited

U.S. PATENT DOCUMENTS

| | | | |
|---|---|---|---|
| 3,400,371 | 9/1968 | Amdahl et al. | 340/172.5 |
| 4,369,494 | 1/1983 | Bienvenu et al. | 364/200 |
| 4,380,798 | 4/1983 | Shannon et al. | 395/725 |
| 4,387,427 | 6/1983 | Cox et al. | 364/200 |
| 4,553,202 | 11/1985 | Trufyn | 364/200 |
| 4,584,644 | 4/1986 | Larner | 395/650 |
| 4,604,694 | 8/1986 | Hough | 395/650 |
| 4,719,569 | 1/1988 | Ludemann et al. | 395/725 |
| 4,736,369 | 4/1988 | Barzilai et al. | 370/94 |
| 4,800,521 | 1/1989 | Carter et al. | 364/900 |
| 4,908,750 | 3/1990 | Jablow | 364/200 |
| 4,965,719 | 10/1990 | Shoens et al. | 395/650 |
| 5,003,470 | 3/1991 | Carpenter et al. | 364/200 |

OTHER PUBLICATIONS

Peterson & Silberschatz, "Operating System Concepts", copyright 1983 by Addison-Wesley Pub. Co., pp. 91-129.
Maekawa et al, "Operating Systems-Advanced Concepts," copyright 1987 by Benjamin/Cummings Pub. Co., pp. 177-206.
M. Purser, "Data Communications for Programmers", copyright 1986 by Addison-Wesley Pub. Co., ch. 5, pp. 72-92.
M. Stella Atkins, "Experiments in SR with Different Upcall Program Structures", ACM Trans. of Computer Systems, vol. 6, No. 4, Nov. 1988.
"MVS/Extended Architecture System Programming Library; System Macros and Facilities", vol. 1, IBM Publication GC 28-1150.
"System/370 MVS and VM OSI/Communications Subsystem General Information Manual", IBM Publication GL 23-0184.

*Primary Examiner*—Kevin A. Kriess
*Assistant Examiner*—John O. Chavis
*Attorney, Agent, or Firm*—R. Bruce Brodie

[57] ABSTRACT

A method for synchronizing the dispatching of tasks from a CPU-based first multitasking operating system (OS) with threads of function calls opportunistically dispatched from a CPU-based second multitasking operating system. The second OS includes a set of callable resources. In the method, a task becomes bound to a thread for the duration of that thread's ownership of a callable resource from the second OS. Also, a thread becomes available on a work queue of threads for binding to a task only if the thread owns exactly one resource. After execution, the function is eliminated from the thread and ownership of that resource is relinquished and passed to the next thread queued on that resource. A task can remain bound to the same thread if there are no other threads asserting ownership to the next resource being called by the original thread. With contention, however, the task relinquishes the thread and becomes bound to another thread on the work queue.

5 Claims, 7 Drawing Sheets

MULTI-TASKING IN A LAYERED COMMUNICATIONS SUBSYSTEM

```
SEGMENT COMSYS;                /*COMMUNICATIONS SUBSYSTEM*/
TYPE                           /*DEFINITION OF DATA STRUCTURES         */
  TIEPTR          =@TIEGROUPBLOCK;
  THREADPTR       =@THREADBLOCK;
  WORKREQUESTPTR  =@WORKREQUESTBLOCK;
  CCBPTR          =@CONNECTIONCONTROLBLOCK;
  LOCKBLOCK = RECORD
        /*USES OPERATING SYSTEM'S DEFINITION NOT SPECIFIED HERE.        */
  END;

TIEGROUPBLOCK   = RECORD       /*TIE GROUP CONTROL BLOCK              */
    FIRSTINQUEUE  : THREADPTR;   /*FIRST THREAD IN FIFO QUEUE           */
    LASTINQUEUE   : THREADPTR;   /*LAST THREAD IN FIFO QUEUE            */
    TIELOCK       : LOCKBLOCK;   /*BLOCK FOR TASK SERIALIZATION         */
  END;

THREADBLOCK = RECORD           /*THREAD CONTROL BLOCK                 */
    NEXTINQUEUE : THREADPTR;     /*NEXT THREAD ON FIFO QUEUE            */
    TOPREQUEST  : WORKREQUESTPTR;/*TOP SERVICE REQUEST ON LIFO          */
  END;                           /*QUEUE                                */

WORKREQUESTBLOCK = RECORD      /*SERVICE REQUEST CONTROL BLOCK        */
    TARGETCCB : CCBPTR;          /*CONNECTION REQUEST IS FOR            */
    NEXTINQUEUE : WORKREQUESTPTR;/*NEXT SERVICE REQUEST ON SAME         */
  END;                           /*QUEUE                                */

CONNECTIONCONTROLBLOCK=RECORD  /*CONNECTION CONTROL BLOCK (CCB)       */
    LAYERNAME : PACKED ARRAY(.1..8.)OF CHAR;/*NAME OF LAYER             */
    TIEGROUP  : TIEPTR;          /*THIS CCB'S TIE GROUP                 */
  END;

WORKQUEUE = RECORD             /*WORK QUEUE CONTROL BLOCK             */
    FIRSTINQUEUE:THREADPTR;      /*FIRST THREAD IN FIFO WORK QUEUE      */
    LASTINQUEUE :THREADPTR;      /*LAST THREAD IN FIFO WORK QUEUE       */
    LOCK        :LOCKBLOCK;      /*BLOCK FOR TASK SERIALIZATION         */
  END;

VAR
  WORKQ   : WORKQUEUE;           /*QUEUE FOR THREADS AWAITING TASKS*/
  RUNNING : BOOLEAN;             /*TRUE MEANS SUBSYSTEM ACTIVE     */

PROCEDURE LOCK(LOCKTOGET : LOCKBLOCK);
BEGIN  /*USES OPERATING SYSTEM'S SERVICES NOT SPECIFIED HERE.    */
END;
```

COMMUNICATIONS SUBSYSTEM CONTROL FLOW

FIG. 4A

```
PROCEDURE WAIT;
BEGIN    /*USES OPERATING SYSTEM'S SERVICES NOT SPECIFIED HERE.*/
END;

PROCEDURE POST;
BEGIN    /*USES OPERATING SYSTEM'S SERVICES NOT SPECIFIED HERE.*/
END;

PROCEDURE INVOKELAYER(THREAD:THREADPTR);
BEGIN    /*USES OPERATING SYSTEM'S SERVICES NOT SPECIFIED HERE.*/
END;

PROCEDURE ENQTIE(VAR OWNER : BOOLEAN;
                    THREAD : THREADPTR);
BEGIN
  WITH THREAD@.TOPREQUEST@.TARGETCCB@.TIEGROUP@ DO
      /*THIS STATEMENT QUALIFIES VARIABLE NAMES BELOW TO THE   */
      /*APPROPRIATE TIE GROUP FOR THE SPECIFIED THREAD         */
    BEGIN
      LOCK(TIELOCK);                /*GETS TIE GROUP LOCK        */
      IF FIRSTINQUEUE = NIL THEN    /*IF FIFO QUEUE EMPTY        */
        BEGIN
          FIRSTINQUEUE = THREAD;    /*ADD ELEMENT TO FRONT       */
          LASTINQUEUE = FIRSTINQUEUE; /*ONLY ELEMENT IN QUEUE    */
          OWNER       = TRUE        /*BECOMES TIE GROUP OWNER    */
        END
      ELSE
        BEGIN
          LASTINQUEUE@.NEXTINQUEUE = THREAD; /*ADD TO END OF QUEUE*/
          LASTINQUEUE = THREAD;     /*LAST ELEMENT IN QUEUE      */
          OWNER       = FALSE;      /*THREAD NOT TIE GROUP OWNER */
        END;
      UNLOCK(TIELOCK);              /*RELEASE TIE GROUP LOCK     */
    END;                            /*END WITH                   */
END;                                /*END PROC ENQTIE            */

PROCEDURE DEQTIE( THREAD : THREADPTR;
                    VAR NEWOWNER : THREADPTR);
BEGIN
  WITH THREAD@.TOPREQUEST@.TARGETCCB@.TIEGROUP@ DO
      /*THIS STATEMENT QUALIFIES VARIABLE NAMES BELOW TO THE   */
      /*APPROPRIATE TIE GROUP FOR THE SPECIFIED THREAD         */
    BEGIN
      LOCK(TIELOCK);                /*GETS TIE GROUP LOCK        */
      FIRSTINQUEUE = THREAD .NEXTINQUEUE;/*DELETE THREAD FROM QUEUE*/
      IF FIRSTINQUEUE <> NIL THEN   /*IF ANOTHER THREAD IN QUEUE */
        NEWOWNER = FIRSTINQUEUE     /*NEXT THREAD IS NEW OWNER   */
      ELSE                          /*NO MORE ELEMENTS IN QUEUE  */
        NEWOWNER = NIL;             /*NO NEW OWNER               */
      UNLOCK(TIELOCK);              /*RELEASE TIE GROUP LOCK     */
    END;                            /*END WITH                   */
END;                                /*END PROC DEQTIE            */
```

COMMUNICATIONS SUBSYSTEN CONTROL FLOW (CONT.)

FIG. 4B

```
PROCEDURE ENQWORK(THREAD:THREADPTR);
BEGIN
   LOCK(WORKQ.LOCK);                    /*GETS WORK QUEUE LOCK      */
   IF WORKQ.FIRSTINQUEUE=NIL THEN       /* IF QUEUE EMPTY           */
     BEGIN
        WORKQ.FIRSTINQUEUE= THREAD;     /* ADD ELEMENT TO FRONT     */
        WORKQ.LASTINQUEUE=THREAD;       /*ONLY ELEMENT IN QUEUE     */
     END
   ELSE                                 /*CASE WHEN QUEUE NOT EMPTY */
     BEGIN
        WORKQ.LASTINQUEUE@.NEXTINQUEU=THREAD; /*ADD TO END OF QUEUE */
        WORKQ.LASTINQUEU = THREAD;      /*LAST ELEMENT IN QUEUE     */
     END;
   UNLOCK(WORKQ.LOCK);                  /*RELEASE WORK QUEUE LOCK   */
   POST;                                /*POST TASK WAITING FOR WORK*/
END;                                    /*END ENQWORK               */

PROCEDURE GETWORK(VAR THREAD:THREADPTR);
BEGIN
   LOCK(WORKQ.LOCK);                    /*GETS WORK QUEUE LOCK      */
   THREAD = WORKQ.FIRSTINQUEUE;         /* GET FIRST THREAD IN QUEUE*/
   IF THREAD<>NIL THEN                  /* IF THREAD EXISTS,        */
     WORKQ.FIRSTINQUEUE=THREAD@.NEXTINQUEUE; / REMOVE FROM QUEUE    */
   UNLOCK(WORKQ.LOCK);                  /*RELEASE WORK QUEUE LOCK   */
END;

PROCEDURE GET NEXT (VAR THREAD:THREADPTR);
BEGIN
   THREAD@.TOPREQUEST=THREAD@.TOPREQUEST@.NEXTINQUEUE;
     /*ABOVE STATEMENT REMOVES FORMER TOP SERVICE REQUEST FROM QUEUE*/
     /*AND ADVANCES NEXT IN QUEUE TO TOP OF QUEUE; SERVICE REQUEST  */
     /*DISPOSED OF BY OPERATING SYSTEM SERVICE NO SHOWN             */
   IF THREAD@.TOPREQUEST = NIL THEN     /*IF NO SERVICE REQUEST EXISTS*/
     BEGIN
       /*THREAD DISPOSED OF BY OPERATING SYSTEM SERVICE NOT SHOWN   */
       /* HERE                                                      */
       THREAD = NIL;                    /*THREAD HAS BEEN DISPOSED  */
     END;
END;

PROCEDURE EXECUTE;   /*MAIN PROCESSING LOOP OF EACH WORK TASK       */
VAR
   OWNER    : BOOLEAN;     /*TRUE MEANS OWNER OF TIE GROUP          */
   THREAD   : THREADPTR;   /* CURRENT THREAD BEING PROCESSED        */
   NEWOWNER : THREADPTR;   /* NEXT OWNER OF TIE GROUP               */
```

COMMUNICATIONS SUBSYSTEM CONTROL FLOW (CONT.)

*FIG. 4C*

```
BEGIN
   RUNNING = TRUE;                    /*SET SUBSYSTEM ACTIVE              */
   WHILE RUNNING DO                   /*LOOP UNTIL SUBSYSTEM DEACTIVATED */
   BEGIN
      GETWORK(THREAD);                /*GET NEXT THREAD TO PROCESS        */
      IF THREAD<>NIL THEN             /*IF THREAD AVAILABLE TO PROCESS    */
         WHILE THREAD<>NIL DO         /*DO WHILE A THREAD TO PROCESS      */
         BEGIN
            INVOKELAYER(THREAD);
            DEQTIE(THREAD,NEWOWNER);  /*RELEASE TIE GROUP OWNERSHIP*/
            IF NEWOWNER<>NIL THEN     /*IF NEW TIE GROUP OWNER EXISTS, */
               ENGWORK(NEWOWNER);     /*PLACE NEW OWNER ON WORK QUEUE */
            GETNEXT(THREAD);          / GET NEXT SERVICE REQUEST ON THREAD*/
            IF THREAD<>NIL THEN       /*IF THREAD STILL EXISTS THEN      */
            BEGIN
               ENQTIE(OWNER,THREAD);  /*ADD TO THE TIE GROUP QUEUE      */
                                      /*OF THE NEXT SERVICE REQUEST     */
               IF NOT OWNER THEN      /*IF NOT OWNER THEN                */
                  THREAD = NIL;       /*SET UP TO GET ANOTHER THREAD*/
            END;
         END                          /*END WHILE THREAD<> NIL           */
      ELSE                            /*NO WORK TO PERFORM AT THIS TIME*/
         WAIT;                        /*WAIT FOR WORK TO ARRIVE          */
   END;                               /*END WHILE RUNNING                */
END;                                  /*EXECUTE PROCEDURE END            */

PROCEDURE STARTTHREAD(REQUEST: WORKREQUESTPTR);

VAR
   OWNER: BOOLEAN;                    /*TRUE MEANS OWNER OF TIE GROUP*/
   THREAD: THREADPTR;                 /*ADDRESS OF NEW THREAD BLOCK */

BEGIN
   /*THREAD BLOCK CREATED BY OPERATING SYSTEM SERVICE NOT SHOWN HERE*/
   THREAD@.TOPREQUEST = REQUEST;      /*ADD SERVICE REQUEST TO THREAD */
   ENQTIE(OWNER,THREAD);              /*ADD TO THE TIE GROUP QUEUE     */
   IF OWNER THEN                      /*IF TIE GROUP OWNER THEN        */
      ENQWORK(THREAD);                /*ADD THREAD TO WORK QUEUE       */
END;
```

COMMUNICATIONS SUBSYSTEMS CONTROL FLOW (CONT.)

FIG. 4D

METHOD FOR SYNCHRONIZING THE DISPATCHING OF TASKS AMONG MULTITASKING OPERATING SYSTEMS

This application is a continuation of application Ser. No. 07/304,740, filed Jan. 31, 1989, now abandoned.

FIELD OF THE INVENTION

This invention relates to a CPU having a multitasking operating system (OS) and a hierarchically-layered communications subsystem, the subsystem utilizing the open system interconnection (OSI) model. More particularly, the invention relates to a method for maximally dispatching operating system tasks in the execution of communication subsystem functions as specified by one or more CPU-based applications.

DESCRIPTION OF PRIOR ART

The prior art believed pertinent to this invention concerns both multitasking OS and layered communications subsystems.

Multitasking

A task is an OS dispatchable unit of work or computational activity. By performing multitasking or switching between tasks, an OS can both distribute CPU access on an interactive as well as batch basis, and increase CPU throughput and utilization.

Each application, when running on a CPU, is manifest by one or more OS tasks. That is, the OS assigns and dispatches a finite number of tasks to counterpart functions as specified by an application or applications. Usually, the number of tasks is significantly less than the number of functions sought by applications to be concurrently executed.

A task, also termed a process, is a program in execution. As a task or process executes, it changes its state. The state of a task is defined by its current activity (new, active, waiting, or halted). Relatedly, the state vector manifestation of a task is a construct denominated as a "task control block" (TCB).

To maximize CPU utilization, some task should be running at all times. In serial machines, this is accomplished by queued access. That is, tasks which are ready and awaiting execution are kept on a list called a work or task ready queue. Recurrently, an OS scheduler/dispatcher determines which task in the ready queue is next to be given access to the CPU. In this regard, a running task continues execution until it either terminates, goes into a wait state (such as caused by performing I/0), has exceeded available time, or is preempted. For additional details relating to CPU scheduling, reference should be made to Peterson and Silberschatz, "Operating System Concepts", copyright 1983 by Addison-Wesley Publishing Co., pp. 91–129.

Layered Communications Subsystems

CPU-to-CPU communications without the benefit of shared memory relies upon message passing as the basis for coordinating their activities with each other. This is sometimes termed "distributed synchronization". When computers and their applications communicate by exchanging messages, there must be a set of established rules or protocols to govern the manner in which communication is allowed to take place. One set of protocols is expressed in the ISO International Standard 7498 relating to a model of Open Systems Interconnection (OSI) architecture.

According to the ISO Standard, an "open system" represents the nodes of a network as a hierarchical structure of "layers" or functions. Each "layer" provides a collection of related functions that can be accessed and used by the "layer" above it in the hierarchy. Also, an "open systems interconnection" refers to a set of protocols used for communications between two or more open systems.

The ISO Standard OSI model delineates seven layers. These include from top to bottom: (7) an application layer, (6) a presentation layer, (5) a session layer, (4) a transport layer, (3) a network layer, (2) a data-link layer, and (1) a physical layer. As a practical matter, layers are variously combined or eliminated. For example, layers (1)–(3) can be folded into a communications layer including the transmission of raw bit streams, the electrical cooperation between send and receive points, automatic error detection and recovery, and any packet and routing management requirements. Also, layers (6)–(7) may be folded together as a single applications layer in that they focus on the presentation and use of information.

OSI, as a multiple-layer architecture, establishes reliable communications and guarantees that messages are received in the same order in which they are sent. In OSI, each layer may be viewed as a service provider. That is, it provides services to the layer, or user above it, in order to allow that user to communicate with its peer at another node.

A layer provides these services by establishing a connection with the next lower layer in the hierarchy until it reaches the bottom or physical communication layer. At this point, a message is impressed upon the physical path to its destination. At the destination node, the same process is repeated but in inverse order. For further details pertinent to distributed process management, reference should be made to Maekawa et al., "Operating Systems—Advanced Concepts", copyright 1987 by The Benjamin/Cummings Publishing Co., pp. 177–206.

The passage of messages vertically down the layers at an originating host node, the transmission horizontally over the physical path or layer to a target node, and the vertical processing up the target node are well described in the prior art. However, most of the problems addressed by the prior art have been of the communications variety emphasizing the horizontal or peer-coupled aspects. These include the establishment of a session, routing, and maintaining synchronization in the presence of noise or variable bandwidth. Illustratively, reference should be made to Barzilai et al., U.S. Pat. No. 4,736,369, "Adaptive Session-level Pacing", issued Apr. 5, 1988.

Indeed, the attitude toward coupling the multitasking from the vantage of the prior art can only charitably be described as casual. For instance, M. Purser, "Data Communications for Programmers", copyright 1986 by Addison-Wesley Publishing Co., chapter 5, pp. 72–92, apparently describes the dispatching of OS tasks as a function of the availability of frames at the synchronous subsystem level. Likewise, reference should also be made to M. Stella Atkins, "Experiments in SR with Different Upcall Program Structures", ACM Transactions of Computer Systems, Vol. 6, No. 4, November 1988, for the state of the published literature in the OS management of layered communications subsystems.

Aspects of an Operating System Environment for OSI Modeled Communication Subsystems As described in Carpenter et al, U.S. Pat. No. 5,003,470, "Method for Tying and Untying Path Access in a CPU-Based, Layered Communications System", filed Dec. 9, 1988, and issued Mar. 26, 1991, when an application in a first CPU sends data to another CPU through the communications subsystem, a construct denominated as a "thread" is used to represent the send data command. The "thread" recites a series of calls to the related functions of counterpart layers. That is, each thread includes a series of requests for work to be performed by counterpart layers.

Each thread constitutes a demand on subsystem resources and bears a relationship to the subsystem as a task does to the OS. As such, each thread assumes one of a set of states (new, active, waiting, or halted). Relatedly, it is the goal of the communications subsystem to create and manage multiple threads concurrently to enhance its throughput and utilization.

Layers, Ties, Threads, and Tasks

As described in the copending Carpenter application, a "connection control block" (CCB) is a construct used to define a connection control state for each layer in the layered communications subsystem. Each layer comprises a plurality of CPU-bound, transaction-oriented subroutines callable by a primitive in a counterpart thread.

Now, the interrelations among the layers are defined by way of connections established a priori among the CCBs associated with counterpart layers. The relationship between CCBs is termed a "tie", and a defined set of tied CCBs is called a "tie group". The creation of a "tie" permits serialization of work over all CCBs tied together within the same layer when running in an environment. That is, tie groups may be considered as communication subsystem resources. As such, there exists a similitude between binding an OS task to a CPU resource, and the binding of a thread to a tie group.

SUMMARY OF THE INVENTION

It is an object of this invention to devise a method to synchronize the dispatching of tasks of a CPU-based multitasking operating system (OS) with the concurrent demands placed upon a CPU-resident, layered communications subsystem by one or more applications.

It is a related object that said method enhance the throughput and utilization of the CPU at the OS and communication subsystem levels.

The method of the invention satisfying the above objects is premised on several unexpected observations:

First, an OS task should be bound to a thread for the duration of that thread's ownership of a tie group within the layer being processed.

Second, a thread becomes available on a work queue of threads for binding to a task only if one service request of the thread is already bound to exactly one tie group.

According to the method of this invention, each task, when ready for work, would obtain the highest priority thread from the work queue of threads and execute it. Any thread on the work queue is known to meet the restriction that only one thread per tie group can be executed at a time. It is also the case that a thread may not be placed on the work queue until it first is the owner of (bound to) a tie group. Additional threads for the same tie group would be queued on the tie group control block.

When this method finishes executing a service request, it will cause the thread it has processed to relinquish ownership of the tie group. This permits the next waiting thread queued against the tie group to become the tie group owner and to be placed on the work queue of available threads.

After a service request for a thread has been executed, it will be removed from the thread. If an additional service request is present, then the thread will be queued onto the respective tie group. If that thread is the first in the tie group queue, then this thread becomes the tie group owner and may be executed now by the current task without having to be placed onto the work queue. This feature allows a single data request from an application to pass through the communications layers using the same task when there is no contention within the system. If the thread was not first in queue for the tie group, then the task would stop processing this thread and attempt to obtain another thread from the work queue to process. The thread abandoned is left on the tie group queue and will be placed on the work queue by some task when the thread becomes owner of the tie group.

BRIEF DESCRIPTION OF THE DRAWING

FIGS. 4A through 4D set out the control flow of a PASCAL implementation of the method of the invention.

DESCRIPTION OF THE PREFERRED EMBODIMENT

As Carpenter et al. point out, the OS provides a run-time environment for the communications subsystem in which the functions constituting the communications subsystem layers perform in a manner consistent with a finite state machine. That is, a typical layer includes a state transition table in its CCB. Also, a typical layer maintains the current state of each of its connections in the CCB. When a layer is invoked to perform a unit of work for a particular connection (in this sense, each request for a layer to provide a service is considered a unit of work), it will take the current state, service request input, and state transition table as parameters to find the software to process the request. Of course, the execution of the ascertained software changes the state of the connection and the layer, and may produce an output.

As mentioned, each request for a layer to provide a service is considered a unit of work. Also as previously mentioned, a layer comprises a set of related callable functions. Thus, the operating system, as do all such systems, will invoke the layer responsive to the request and return from it when the associated process or function is completed. Each request, i.e., unit of work, is associated with a particular CCB.

In the event that a layer currently executing calls one function resident in another layer, then that request or call is scheduled to be run next. It is imperative that all requests issued for the same CCB (layer) be executed in the order issued.

The ISO OSI Reference Model

Figure 1:
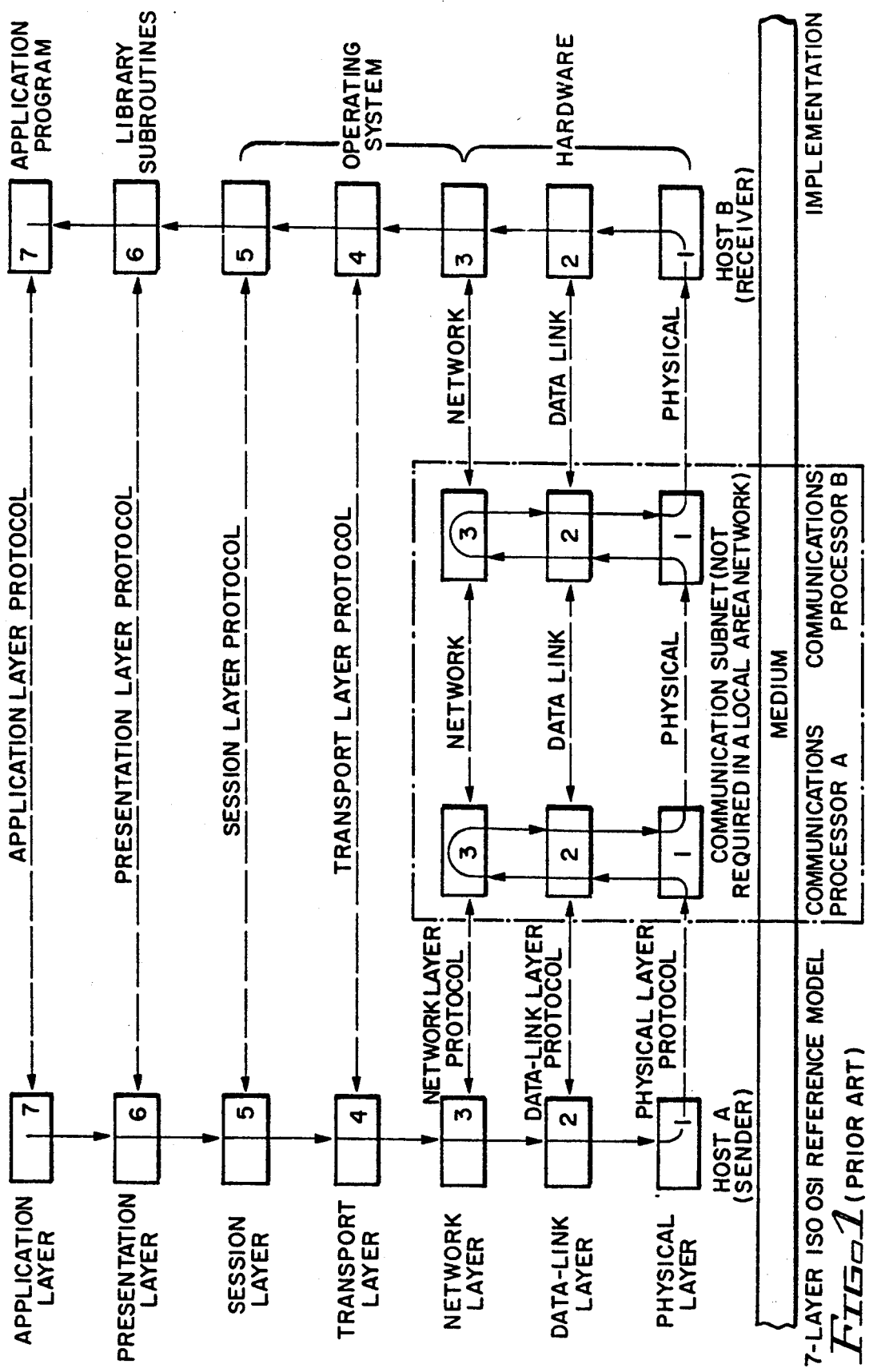
FIG. 1 (prior art) refers to a modified, multiple-layer ISO OSI reference model emphasizing the vertical movement of message processing within a host and the horizontal movement between hosts.

Referring now to FIG. 1, there is shown a seven-layer ISO OSI reference model. As previously mentioned, several principle of layered communications. That principle is that each layer constitutes a set of functions invoked by so-called primitives which are executable independent of other layers, although they are run in a predetermined order. Some of the functions may invoke functions residing in adjacent layers. That is, a function at layer N may call a function in layer N-1. The interface between two layers can be mandated through a service access point. In this regard, a lower layer conceptually is the service provider to a higher layer. From the lower layer's perspective, the higher layer is the service user.

OSI Layers and Message Processing

Figure 2:
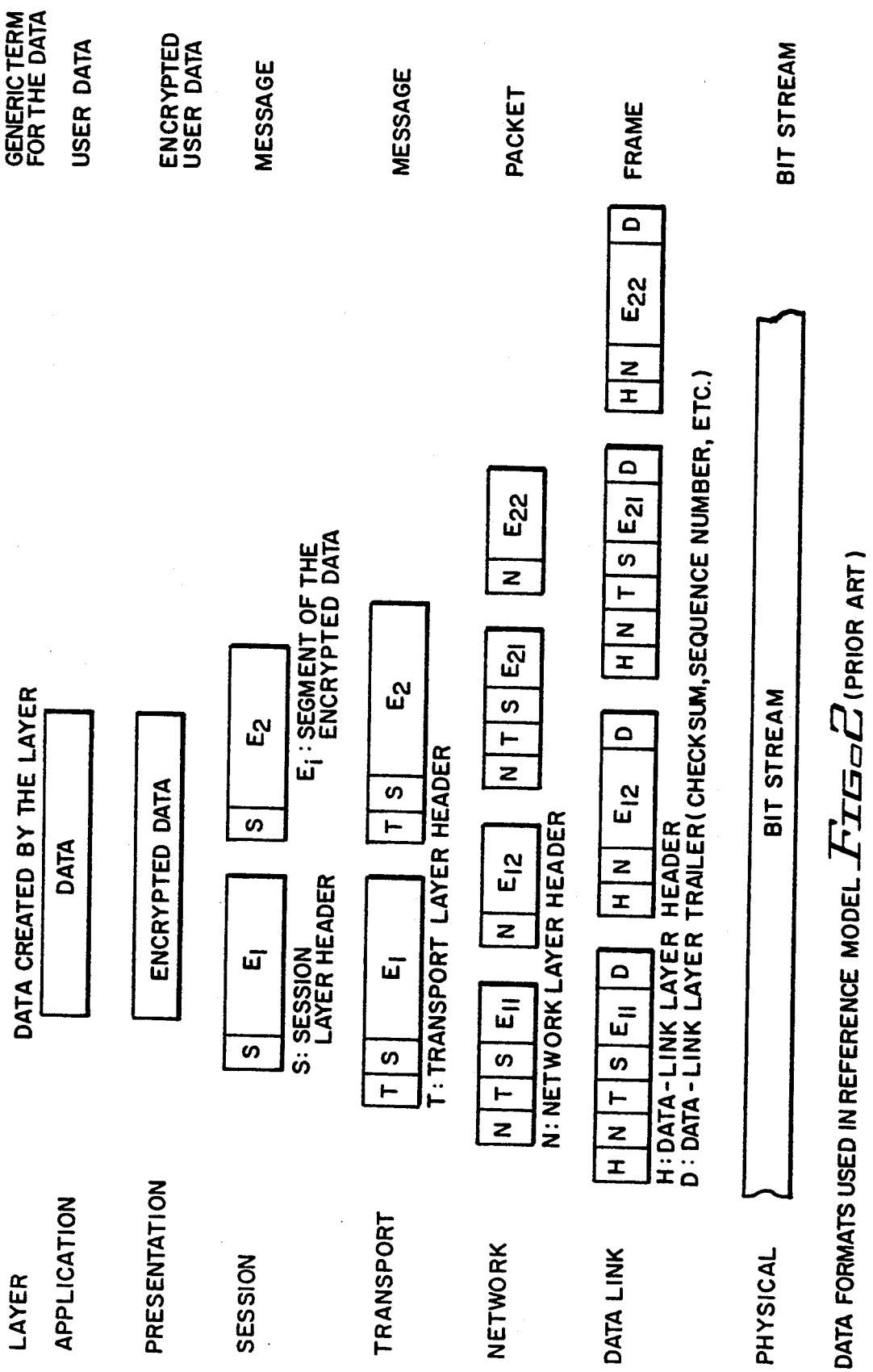
FIG. 2 (prior art) sets out a base message or data generated by an application layer and the modifications made as the intermediate layer and communication layer make thereto prior to transmission.

Referring now to FIG. 2, there is shown an illustrative data structure and the modifications thereto made by the functions in various layers as the action passes vertically down from the application layer through the physical layer. In this regard, the application and presentation layers define user-to-user communication (interuser communications protocol); the session and transport layers define process-to-process communication (interprocess communications protocol); and the network, data-link, and physical layers define the actual data transmission (intercomputer communications protocol).

Illustratively, suppose CPU A desired to send a message M to CPU B over the OSI system having three layers; namely, an application layer, an intermediate layer, and a communications layer. As each process constituting a successive layer is called, it operates upon the message. Thus, for a message M generated by the application layer, the intermediate layer alters the message to become k1(M). Next, the communications device layer, in turn, modifies the result to become k2(k1(M)). The composite message is sent over the network and is received by destination CPU B as k2(k1(M)). Since the composite is decomposed in inverse layer order, arguably it may be said that each layer communicates with its peer. Thus, intermediate layer A sends the message k1(M) to intermediate layer B, while the application layer at CPU B is the only layer in receipt of the pristine original message M.

Connections, Control Blocks, and Layers

To perform meaningful work, the user at one endpoint will establish a "connection" with a target endpoint. The action will follow a path through the appropriate layers which provide the necessary services to the calling or invoking user. A construct termed a "connection control block" (CCB) represents a portion of the total connection between the endpoints in the two systems when one layer requires the services of another layer. This means that a CCB exists at each layer-to-layer boundary, and the "connection" within each system is defined by the chain of related CCBs.

Examples of the Interaction Among Connections, CCBs, and Layers

Figure 3:
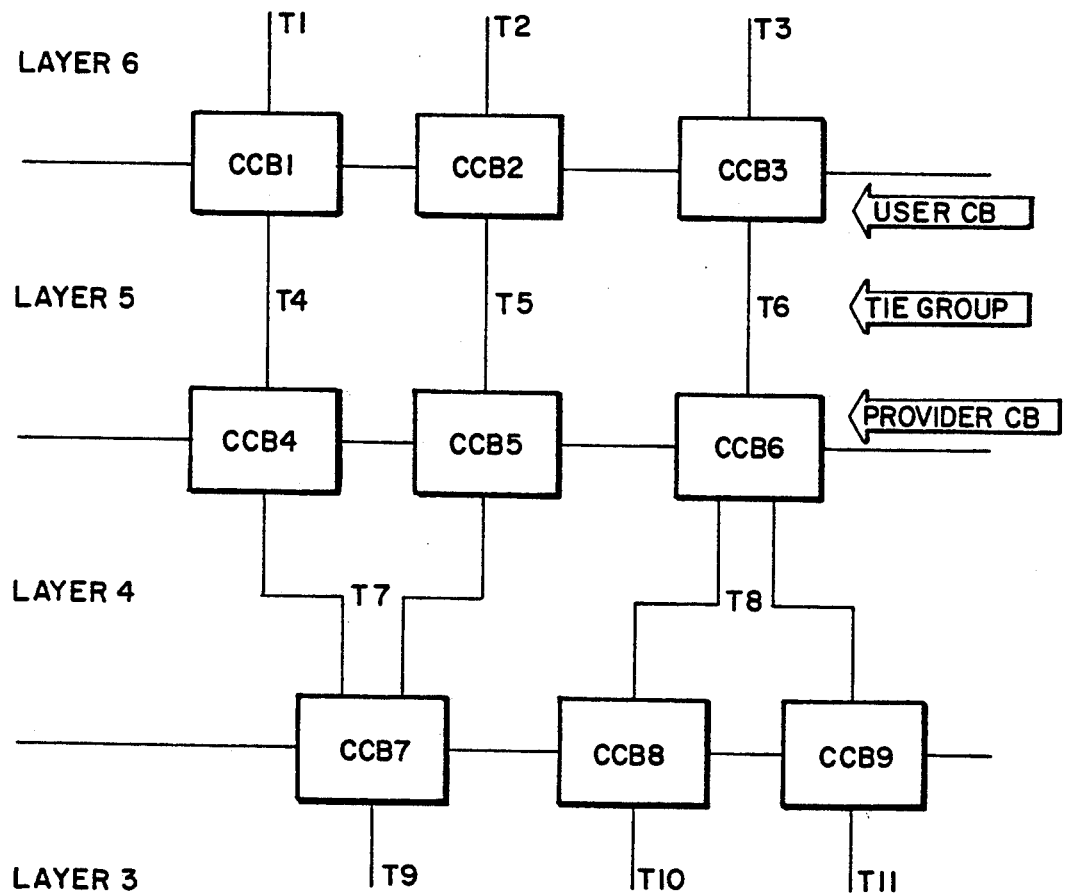
FIG. 3 shows an abstract representation of tie group categories as used by the invention.

Referring now to FIG. 3, there are shown several connection control blocks (CCBs) belonging to nine different tie groups. It should be recalled with regard to FIG. 3 that it is the communication subsystem which binds threads to tasks. Also, multiple invocations per layer are allowed. Further, only one invocation at a time per tie group is permitted.

Assume the subsystem has available three tasks for the execution of threads.

EXAMPLE 1

Multiple invocations of the same layer

Let the three applications represented by CCB1, CCB2, and CCB3 be sending data at the same time. The subsystem will allocate one task to service each application's send and there will be three simultaneous invocations of layer 6, one each for tie group T1, T2, and T3. As the sends progress to layer 5, there would be three simultaneous invocations for T4, T5, and T6. As the sends progress to layer 4, there could be only two simultaneous invocations of layer 4, one for T7 and T8. The requests from CCB4 and CCB5 would be processed serially and one task would become idle.

EXAMPLE 2

Multiple invocations for the same connection

Continue Example 1 by having data arrive over the network for the application represented by CCB1 just as the one task becomes idle. The task would then be used to invoke layer 3 for CCB7, while layer 4 is invoked for CCB4 and CCB8. There are now two simultaneous invocations for the same application connection, one in layer 3 and one in layer 4, since CCB4 and CCB7 both are for the connection represented by CCB1.

EXAMPLE 3

No task switch between layers

Let the data arriving over the network in Example 2 come prior to the three applications issue of their send data requests. One task would be used to invoke layer 3 for T9, and then layer 4 for T7, and then layer 5 for T4 to process the incoming data. If the applications send their data now, then while layer 5 is invoked for CCB4, layer 6 could be invoked for CCB1 and CCB2. The invocation of layer 6 for CCB3 must wait for an available task since all three are active. There would now exist two invocations of layer 6 for different connections, while there is an invocation of layer 5 for one of the same connections. However, it is not necessary to switch tasks just because the layer boundary has been crossed.

The Host CPU Environment for Executing the Method of the Invention

The invention can be conveniently practiced in a general purpose computer having a multitasking operating system such as an IBM/360 or 370 architected CPU using the IBM MVS operating system with the time-share option TSO. An IBM/360 architected CPU is fully described in Amdahl et al., U.S. Pat. No. 3,400,371, "Data Processing System", issued Sep. 3, 1968.

The MVS operating system with the TSO option is set out in IBM publication GC28-1150, "MVS/Extended Architecture System Programming Library: System Macros and Facilities", Vol. 1. A layered communications subsystem following an OSI model is manifest by the IBM Open Systems Interconnection Communications Subsystem, Version 1, Release 1, announced on Sep. 20, 1988. The principles of operation of the subsystem are taught in IBM publication GL23-0184, "System/370 MVS and VM OSI/Communication Subsystem General Information Manual".

Details of standard MVS or other operating system services such as lock management, subsystem invocation by interrupt or monitor, and the posting and waiting of tasks is omitted. These OS services are believed well appreciated by those skilled in the art.

Syntax of a PASCAL Implementation

Referring now to FIGS. 4A to 4D, there is shown a PASCAL implementation of the method of this invention. PASCAL is a strongly-typed language and requires that all data constructs, subroutine functions, and procedures be explicitly declared. Organizationally, the syntax begins with a definition of each of the constructs and variables, a recitation of each of the subroutine functions or procedures, and ends with a main procedure. Depending upon the degree of prior subroutine function or procedure definition, the main program may be little more than calls to said functions and procedures. In this regard, the main program defines calling order, conditions, and iterations.

Illustratively, the syntax may be expressed as:

```
Program <name>
    Type <definition of global constructs>
    Var <global variables>
    Procedure <name1> <parameters/values>
        Type <local constructs>
        Var <local variables>
        Begin
        ─────
        End;
    ───────
    Begin      (* main procedure *)
        While <condition> Do
            Begin
                name1;
                ...
            End
    End.
```

Listing of the Defined Procedures in the Embodiment

Lock—Requests task serialization.
UnLock—Releases task serialization.
Wait—Suspends a task during periods of inactivity.
Post—Resumes task execution.
InvokeLayer—Passes control to a specified communications layer.
EnqTie—Adds a thread onto a tie group queue.
DeqTie—Removes a thread from a tie group queue.
EnqWork—Adds a thread onto the work queue.
GetWork—Obtains the highest priority thread ready for execution.
GetNext—Advances the thread to the next service request.
Execute—Main routine controlling the dispatching of work. This routine would be executed by each of the tasks executing in the communications subsystem.
StartThread—Starts a new thread.

ComSys Described

Referring again to FIG. 4A, the program or segment is labeled ComSys. ComSys conforms to the PASCAL language syntax described above. As set out in the foregoing listing, all of the procedures including references to OS services precede the main procedure Execute. Also identified in FIG. 4D is the procedure StartThread. StartThread is cross-connected with selected ComSys subroutines. Also, StartThread is invocable externally by a CPU host-based application sending data or data arriving over a network from a remote host application.

Referring now to the beginning of segment ComSys in FIG. 4A, it should be observed that each of the major constructs is represented by a control block. These are namely Tie Group Block, Thread Block, Work Request Block, and Connection Control Block (CCB). Also represented are a Lock Block and, most significantly, a WorkQueue. All of the constructs use the PASCAL record type. This type permits the association of heterogeneous data type primitives within one form.

Procedure Execute starting on FIG. 4C is the main processing loop of each work task. The basic loop is of the WHILE—DO type, continuing as long as the Boolean condition labeled RUNNING is true.

It will be helpful to digress to the procedure StartThread shown in FIG. 4D and following the procedure Execute. In this regard, new threads are created by external stimuli to the communication subsystem such as a local CPU-based application sending data, or data arriving over the network from a remote host-based application. Also, the communication layers themselves may create additional threads during their normal processing. Consequently, Execute procedure.

StartThread will create a new thread containing a specified service or work request. The thread, after it is formed, is queued to the appropriate tie group as indicated by the CCB specified in the service or work request. If the thread becomes the owner of the tie group, then it will be added to the WorkQueue defined as PASCAL record construct type in FIG. 4A where an available task will be able to find it. If the thread is not the tie group owner, then it will not be placed onto the WorkQueue at this time. However, whenever the thread becomes the tie group owner, it will then be placed on the WorkQueue by the Execute procedure.

Referring again to procedure Execute in FIG. 4C as previously mentioned, this procedure is executed by each of the tasks processing threads in the communication subsystem. Each task, when ready for work, obtains the highest priority thread from the WorkQueue and executes it. Any thread on the WorkQueue is known to meet the restriction that only one thread per tie group can be executed at a time. This is because a thread may not be placed on a WorkQueue until it is first an owner of a tie group. Additional threads for the same tie group are queued on the tie group control block. Note that the first called function in FIG. 4D in the WHILE—RUNNING—DO loop is GetWork defined in figure. The procedure GetWork places a lock on the WorkQueue and tests the WorkQueue. It obtains a thread and removes both the thread and the lock from the queue.

Next, procedure Execute executes the service request specified by the thread. If there is no thread, then no work is performed at this time, and procedure Execute is placed into a wait state until a thread is created and placed on the WorkQueue. Referring to the first WHILE—DO in FIG. 4D loop nested within the WHILE—RUNNING—DO loop, work is performed by passing control to a specified communication layer by way of the InvokeLayer procedure.

The InvokeLayer procedure as mentioned in FIG. 4B executes the top service request on a specified thread by calling the layer named in the related CCB. The layer is passed to the work request and CCB for processing. Communication layers are normally described as finite state machines. The CCB would contain the current state and the work request as input. The layer processes may generate additional service requests, and will update the CCB to reflect a state transition.

Parenthetically, a number of the defined functions such as InvokeLayer, Lock, Unlock, Wait, and Post do not recite explicit code, but refer to the fact that they call for standard operating system services which are otherwise well known and appreciated by those skilled in this art.

After a service request has been executed through the InvokeLayer routine, ownership of the tie group will be released. This is actualized by the procedure DeqTie as found in FIG. 4B. DeqTie removes a thread from the FIFO queue associated with the tie group. The next first thread in the queue, if one exists, becomes the new tie group owner. The new owner is placed on the WorkQueue so that it may continue in its search for a task to execute it.

If an additional service or work request is present, then the thread will be queued onto the respective tie group. If the thread is the first in the queue, then this thread becomes the tie group owner and may be executed now by the current task without having to be placed onto the WorkQueue. This particular feature allows a single data request from an application to pass through the communication layers using the same task when there is no contention within the system. If the thread were not the first in queue for the tie group, then the task would have to stop processing this thread and attempt to obtain another thread from the WorkQueue to process. The thread which is abandoned is left on the tie group queue and will be placed on the WorkQueue by some task when that thread becomes the owner of the tie group.

Within the Execute procedure found at the middle of FIG. 4D, it is the call to the GetNext procedure depicted in FIG. 4C that removes the work request just executed and obtains the next work request on the same thread. If another work request exists on the thread, then the EnqTie procedure is called to add the thread onto the queue associated with the tie group. If first in the queue, then this thread becomes the tie group owner and the Execute procedure remains within the nested WHILE—DO loop to process the next work request on the same thread. If this thread is not the tie group owner, then the Execute procedure remains in the outer WHILE—RUNNING—DO loop to select another thread via the call to the GetWork procedure.

What is claimed is:

1. In system having a CPU including a first and a second multitasking operating system (OS), means responsive to data originating from one or more applications either executing with said first OS or externally on another CPU for invoking threads of function calls (FIG. 4D, StartThread) by the second OS, a method for synchronizing the dispatching of tasks from the first OS with counterpart threads dispatched from the second OS, said second OS including a plurality of of callable layered resources, comprising the steps by the second OS in nested iterative order of:

(a) enqueuing (FIG. 4B, EnqTie) each thread against each second OS resource, each second OS resource being named by a function call in said thread;

(b) securing resource ownership (FIG. 4B, DeqTie) to each thread among those threads enqueued against any one of the second OS resources in step (a) by binding at least a first and a second thread to respective first and second resources upon the condition that:

(1) the first or second threads occupy predetermined positions within the respective first and second resource queues (i.e. the initial thread in a FIFO queue), and (2) said first or second threads donot own any other resource;

(c) enqueuing (FIG. 4C, EnqWork) the first and second threads against ones of a set of available tasks in a predetermined order as each thread satisfies step (b), binding (FIG. 4C, GetWork) a first one of the available tasks to an initial thread (i.e. first or second thread) among the threads enqueued against the tasks, and, executing (FIG. 4B, InvokeLayer) a predetermined one of the function calls of the initial thread by the bound first task; and (d) after execution in step (c), causing (FIG. 4B, DeqTie) the initial thread in step (c) to relinquish ownership of its resource, causing any next thread queued against said same resource and satisfying step (b) conditions (1) and (2) to become the owner of that resource and to be enqueued against tasks.

2. A method for synchronizing the dispatching of tasks from a CPU based multitasking operating system (OS) responsive to at least one demand placed by at least one application upon a CPU resident open system interface (OSI) type layered communications subsystem, said subsystem including callable resources associated with the layers and forming a thread of service requests (FIG. 4D, StartThread) to a set of resources counterpart to each demand, comprising the steps executed by said OSI subsystem of:

(a) enqueuing (FIG. 4B, EnqTie) each thread against each OSI subsystem resource named by a service request in said thread;

(b) securing resource ownership (FIG. 4B, DeqTie) to each thread among those threads enqueued against any one of the OSI subsystem resources by binding at least a first and a second thread to respective first and second OSI subsystem resources upon the condition that:

(2) the first or second threads occupy a predetermined position within the respective first and second resource queues (i.e. initial thread in a FIFO queue), and (2) the first or second threads donot own any other OSI subsystem resource;

(c) enqueuing (FIG. 4C, EnqWork) the first and second threads against tasks as each thread satisfies step (b), binding (FIG. 4C, GetWork) a first one of the available tasks to an initial thread among the threads enqueued against the tasks, and, executing (FIG. 4B, InvokeLayer) a predetermined one of the service requests of the initial thread by the bound first task; and (d) after execution, causing (FIG. 4B, DeqTie) the initial thread in step (c) to relinquish ownership of its OSI subsystem resource, causing any next thread queued against said same OSI subsystem resource and satisfying step (b) conditions (1) and (2) to become the resource owner and to be enqueued against tasks.

3. The method according to claim 2, wherein after a service request named in a thread has been executed, removing said service request from the thread.

4. In a system having a CPU including a multitasking operating system (OS) and a multitasking layered communications subsystem, a method for allocating tasks in the OS to threads of service requests generated by the layered communication sub-system as a function of service request (work) distribution, each communication subsystem layer (FIG. 3) providing a unique set of functions for establishing an association between counterpart connection endpoints, each layer being manifest by at least one control block, each control block being a state representation of the connection end-points in that layer, each control block further including indicia of a request to provide service, each thread being denominated as a sequence of related service requests performed in a synchronous manner, each service request being associated with counterpart control block, each control block further being split within a layer such that it depicts the adjacent layers to a connection within any given layer, each layer including at least one tie, each tie being the connection relation between split portions of the control block in the same layer, a tie group being an undirected graph of ties, only one thread executing per tie group at a time, comprising the steps in nested iterative order of:

(a) starting at least a first and second thread (FIG. 4D, StartThread) responsive to counterpart communication subsystem oriented commands originated by at least a first application executing on said CPU or externally received by said subsystem;

(b) enqueuing (FIG. 4B, EnqTie) said first and second threads against counterpart tie groups named by each service request in each of said threads;

(c) securing tie group ownership (FIG. 4B, DeqTie) to said first and second threads as among any threads enqueued against any one of the tie groups upon the condition that:
 (1) the first or second thread occupies a predetermined position within the counterpart tie group queue (i.e. the initial thread in a FIFO queue), and
 (2) the first or second thread does not own any other tie group;

(d) enqueuing (FIG. 4C, EnqWork) the first and second threads against a set of available tasks upon each thread satisfying step (c), binding (FIG. 4C, GetWork) a first one of the available tasks to an initial thread among the threads enqueued against the tasks (FIG. 4A WorkQueue)
 said binding occurring provided that there is no other thread in said queue of threads with a service request to a control block in the same tie group already bound to any task,
 in the event that the first available thread violates the constraint of there being only one bound thread per tie group, binding of another available thread in the same tie group only after the first thread becomes free,
 and, executing (FIG. 4B, InvokeLayer) a predetermined one of the service requests of the initial thread bound to said first task by the bound first task; and (e) after execution, causing (FIG. 4B, DeqTie) the initial thread in step (d) to relinquish ownership of its tie group, causing a predetermined one threads queued against said same tie group satisfying step (a) conditions (1) and (2) to become the resource owner and to be enqueued against tasks.

5. In system having a CPU including a first and a second multitasking operating system (OS), means responsive to data originating from one or more applications either executing with said first OS or externally on another CPU for invoking threads of function calls (FIG. 4D, StartThread) by the second OS, an apparatus for synchronizing the dispatching of tasks from the first OS with counterpart threads dispatched from the second OS, said second OS including a plurality of callable layered resources, comprising:

(a) means including the second OS for enqueuing (FIG. 4B, EnqTie) each thread against each second OS resource, each second OS resource being named by a function call in said thread;

(b) means including the second OS for securing resource ownership (FIG. 4B, DeqTie) to each thread among those threads enqueued against any one of the second OS resources in step (a) by binding at least a first and a second thread to respective first and second resources upon the condition that:
 (1) the first or second threads occupy predetermined positions within the respective first and second resource queues (i.e. the initial thread in a FIFO queue), and
 (2) said first or second threads donot own any other resource;

(c) means including the second OS for enqueuing (FIG. 4C, EnqWork) the first and second threads against ones of a set of available tasks in a predetermined order as each thread satisfying step (b), for binding (FIG. 4C, GetWork) a first one of the available tasks to an initial thread (i.e. first or second thread) among the threads enqueued against the tasks, and, for executing (FIG. 4B, InvokeLayer) a predetermined one of the function calls of the initial thread by the bound first task; and (d) means including the second OS responsive to the execution in step (c), for causing (FIG. 4B, DeqTie) the initial thread in step (c) to relinquish ownership of its resource, for causing any next thread queued against said same resource and satisfying step (b) conditions (1) and (2) to become the owner of that resource and to be enqueued against tasks.

* * * * *